United States Patent Office.

HENRY J. HAMILTON, OF BROOKLYN, NEW YORK.

Letters Patent No. 103,876, dated June 7, 1870.

IMPROVED COMPOUND TROCHE OF BUCHU.

The Schedule referred to in these Letters Patent and making part of the same

*To all whom it may concern:*

Be it known that I, HENRY J. HAMILTON, of Brooklyn, in the county of Kings and State of New York, have invented a new and improved Troche, which I term "Hamilton's Compound Troches of Buchu;" and I do hereby declare that the following is a full, clear, and exact description of the ingredients comprising the same, and the mode of preparing them.

I take the leaves of buchu, and grind or pulverize them, so that they will be reduced to a fine powder. I then subject them to a percolating process, about fifty pounds of leaves being used to fifty pounds of alcohol. By this means a strong extract is obtained, to which one hundred pounds of sugar are added, and the whole allowed to evaporate until a dry powder alone remains. To this powder I add, extract of conium, twelve pounds; oil of winter-green, six ounces; oil of santel, one and one-fourth ounce; gum-arabic, four pounds; and water sufficient to render the mass of a pasty consistency, so that it may be formed into troches of any proper size and shape.

These troches are designed to relieve all complaints for which buchu is considered a remedy.

I claim as new and desire to secure by Letters Patent—

Buchu troches, composed of the ingredients, prepared or treated in the manner, and about in the proportions specified.

The above specification of my invention signed by me this 17th day of May, 1870.

H. J. HAMILTON.

Witnesses:
 WM. F. MCNAMARA,
 A. R. HAIGHT.